Feb. 29, 1944.   A. B. WILSON   2,342,715
REINFORCING RIM AND METHOD OF MAKING IT
Filed April 25, 1940
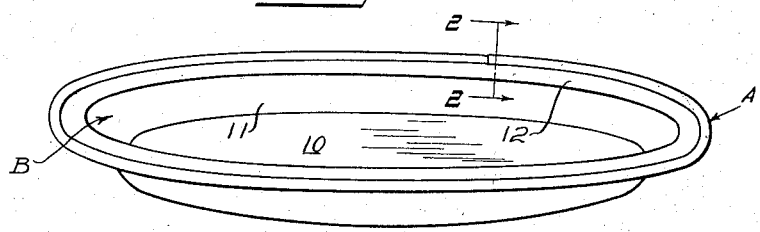
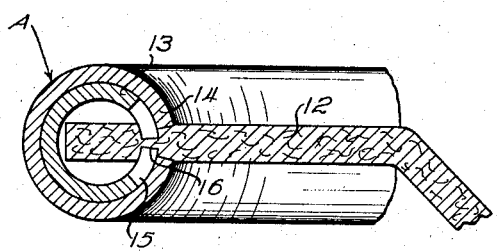
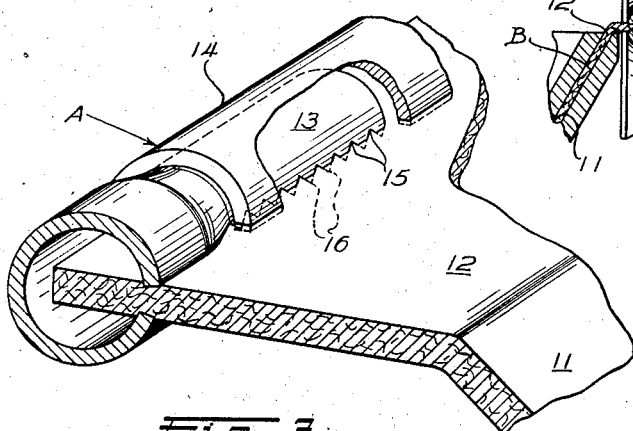
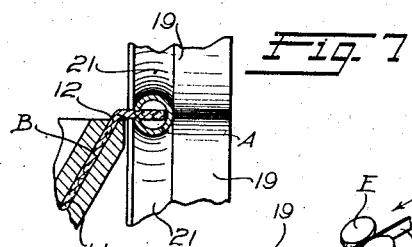
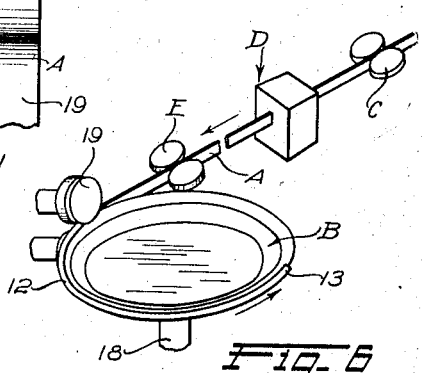
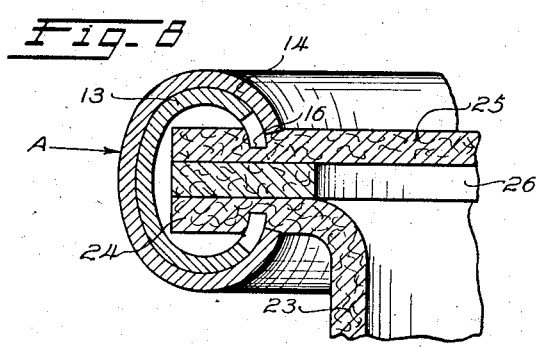
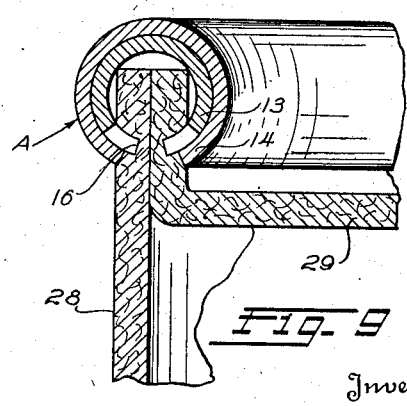
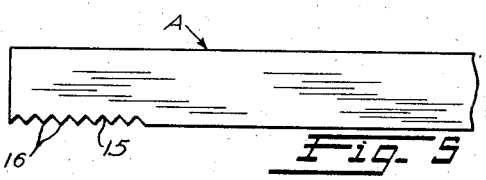
Inventor
Allen B. Wilson
By Strauch & Hoffman
Attorneys Patented Feb. 29, 1944

2,342,715

UNITED STATES PATENT OFFICE 2,342,715

REINFORCING RIM AND METHOD OF MAKING IT

Allen B. Wilson, Evanston, Ill., assignor, by mesne assignments, of one-half to Kimberly Stuart and one-half to Elizabeth R. B. Stuart, Menasha, Wis.

Application April 25, 1940, Serial No. 331,642

4 Claims. (Cl. 229—2.5)

This invention relates to articles constructed of sheet material such as paper pie plates, cake trays and other containers or receptacles, and also other articles, such as lamp shades, light reflectors, waste baskets and the like, constructed of sheet material such as paper, and more particularly to methods and means for reinforcing the marginal portions of such articles, and also securing closures in place on containers.

In the co-pending application of Allen B. Wilson and E. V. Swangren, Serial No. 228,028, filed September 1, 1938, there is disclosed a machine for applying a thin metal reinforcing rim to paper plates and other articles, and in my co-pending application Serial No. 272,493, filed May 8, 1939, and in the application of Stuart and Wilson, Serial No. 272,516, filed May 8, 1939, certain articles made in accordance with that invention are specifically disclosed and claimed. It is the object of the present invention to generally improve and refine the articles and the method of making them shown in the aforementioned applications.

More particularly it is the major object of this invention to provide an article with a reinforcing rim which is tightly forced into gripping engagement with a marginal portion or peripheral edge of the article and has its ends overlapped, and to so design the resulting joint as to avoid cutting or unduly weakening the material in the region of the joint.

Another object is to provide a novel rim of generally C-shaped section having a length slightly greater than the periphery of the article, so that its ends will overlap when applied, and to so shape the telescoped portion of the rim that it will not exert a continuous cutting or shearing action upon the material of the article when it is forced into gripping engagement therewith.

A further object is to provide a novel rim structure for securing closures to containers and the like.

A further object is to equip the edge or marginal portion of paper or like articles with a novel rim which fits around the article with its ends overlapped, and one or both side edges of the overlapped end is serrated or toothed, so that continuity of engagement is interrupted, and the rim may bite into the article without cutting or shearing it.

Another object is to devise a novel method of applying a metallic rim to the edge of paper or like articles.

Further objects will become apparent as the specification proceeds in connection with the annexed drawing, and from the appended claims.

In the drawing:

Figure 1 is a perspective view of a pie plate or paper dish embodying one of the novel rims of my invention;

Figure 2 is an enlarged sectional view of the plate shown in Figure 1, taken substantially on the line 2—2 of that figure;

Figure 3 is a perspective view of the joint between the ends of the metal rim, with parts broken away to more clearly illustrate the construction;

Figure 4 is a plan view of the serrated end of the rim before application to the article;

Figure 5 is a similar view of a modified form of rim;

Figure 6 is a diagrammatic view illustrating the manner in which the rim is applied to the article;

Figure 7 is a view illustrating the manner in which the crimping rolls laterally compress the rim into C-shaped cross-section;

Figure 8 is an enlarged cross-sectional view through a container having my novel rim applied thereto; and Figure 9 is a view similar to Figure 8, but illustrates a modified form of container.

With continued reference to the drawing, wherein like reference characters have been employed to designate like parts wherever they occur, I have illustrated my novel rim A as being applied to a paper pie plate B, although it is not limited to such use and may be applied to any receptacle or article wherever a strengthening or stiffening action is desired along one or more peripheral or marginal portions thereof or where a closure is required uniting two or more parts of a unit.

Plate B is provided with a bottom wall 10, an inclined side wall 11 and an outwardly directed flange 12 to which rim A is tightly secured.

As seen in Figures 2 and 3, one end of the rim 13 is telescoped within the other end 14. Before application to the plate the rim may be slightly curved transversely or be substantially flat, as shown in Figure 4. As seen in this figure, the side edges of the rim, adjacent one end, are provided with relieved or cut out portions 15, to form serrated edges.

In the specific embodiment of the invention illustrated, the cut out portions form pointed teeth 16 between them although it is to be understood that, since the major object is to interrupt continuity of engagement of the side edges of the inner telescoped end of the strip with the article, it is not essential to form pointed teeth. Therefore, the fact that teeth 16 are formed between the relieved portions is incidental to the relieving or serrating operation. For instance, cut out portions 15 may be rectangular instead of triangular as shown, so as to form blunt ended teeth between them, without departing from the spirit of the invention.

The rim is applied by a pair of rolls which are substantially unyielding, so that when the overlapped portion of the rim passes through the rolls, the inner section is rather sharply reduced in diameter. The transition from large to small diameter is seen more clearly in Figure 3.

As seen in Figures 2 and 3, the serrations are provided in the inner or telescoped end 13, and since the inner end 13 is of smaller radius than the outer end, teeth 16 penetrate the material of flange 12. The side edges of outer end 14 are also embedded to some degree in flange 12, as indicated in Figures 2 and 3, and therefore the finished joint presents a clean appearance, with none of the side edge portions of the rim visible. Also, the embedded side edges of the rim and the teeth securely fasten the rim and prevent it from pulling away from the article.

It is therefore apparent that I have provided a rim structure comprising a strip of metal compressed laterally into general C-shaped section, with effective means to prevent shearing of the flange of the article when the ends of the rim are overlapped, and yet the completed articles are strong and present a clean and neat appearance.

If desired, the strip may be serrated along one side edge only, as shown in Figure 5. This form of the invention avoids shearing of the flange of the article in much the same manner as the one just described. Teeth 16 bite into the flange, and although the other side edge is unrelieved, no shearing occurs because the gripping or biting action is discontinuous circumferentially of the article. In other words, so long as the gripping of the article between a pair of unrelieved edges is avoided, shearing does not occur.

The rim may be applied to the plate in any desired manner, but I preferably employ the structure diagrammatically shown in Figures 6 and 7, as it has proven very satisfactory in practice. As shown in Figure 7, the plate B is mounted on a cup-shaped mandrel carried by a rotatable shaft 18, and may be clamped in place thereon by any suitable means (not shown). Flange 12 of the plate is disposed adjacent a pair of crimping rollers 19, each of which is provided with a groove 21, of semi-circular shape in section, as seen in Figure 7.

Strip A is fed from a roll of flat strip material by a pair of feed rolls C into a cutter mechanism D. Cutter mechanism D is provided with means for simultaneously serrating one or both side edges of the leading edge of the strip, and is located the proper distance from crimping rolls 19 to cut off a strip of the requisite length to go around the article with a predetermined amount of overlap. A pair of feed rolls E take the severed strip and feed it into crimping rolls 19 at the proper point in the operation.

Briefly describing the rimming operation, the strip is fed by rolls C into the cutter, which is operated to serrate the leading end of the strip. The strip is then threaded through rolls E and brought into the proper position between crimping rolls 19, which are separated at this time. After the initial "threading" operation just described, the further sequences of the rimming operation occur as follows:

Cutter D is operated to cut the strip and to serrate the leading end of the strip material gripped in rolls C. Rolls 19 are then brought into the relationship shown in Figure 7, with the rim and the flange of the plate firmly gripped between them, and they feed the severed strip forwardly and progressively curl it into approximately C-shape section into biting engagement with the article. Since the leading end of the strip is serrated, it takes a firm hold on flange 12, and as the rimming operation proceeds, the rim is smoothly bent around the circumference of the article. When end 14 is finally crimped over inner end 13, the rimming of the article is completed. Rolls 19 are then separated to permit the article to be removed.

The various rolls are preferably continuously rotated, and a properly timed mechanism is employed to automatically move them toward each other into gripping engagement with the strip at the proper point in the operation.

Just after the crimping rolls 19 are moved into engagement with the strip as just described, rolls C and E are moved into gripping relation to feed the material toward the crimping rolls, so that when the article has been rimmed, a fresh strip will be in position to rim the next article.

Rolls E are preferably so shaped as to cause the strip to assume a slightly transversely curved shape prior to entry into crimping rolls 19, so that they in effect initiate the curling operation. Cutter mechanism D may be so timed as to sever the strip either at the conclusion of the preceding operation, or after the plate is clamped on the mandrel, and just prior to closure of the crimping rolls. In either event it simultaneously cuts the strip and serrates one or both of the side edges of the leading end of the next strip. By adjusting the cutting mechanism bodily toward or away from rollers 19, the length of severed strip may be adjusted to fit various size articles. The machine just discussed is shown in detail in an application to be filed, and will therefore not be further discussed herein, the present disclosure being made to show the novel method of the invention.

In Figure 8 I have shown a container 23 having a flange 24, and a top 25, with a gasket 26 disposed between them, and secured together by the novel rim of my invention. Rim A is applied to the article in much the same manner as that described in connection with the pie plate of Figure 1, with serrated end 13 telescoped within end 14 and having its teeth 16 firmly embedded in flange 24 and cover 25, respectively.

In Figure 9 a cylindrical container 28 is provided with a flanged closure 29 secured in place by my novel rim. Rim A is applied to this container in substantially the same manner as the pie plate of Figure 1, except in this instance the axes of the crimping rolls are disposed substantially parallel to the axis of rotation of the container during the crimping operation. When the operation is complete, serrated end 13 is disposed within end 14 and has its teeth 16 disposed in penetrating engagement with the upper end of wall 28 and the flange of cover 29.

The novel rim of my invention may be also applied to other articles having marginal portions of one or more thicknesses of material, such as cake trays and other containers or receptacles, and also other articles such as lamp shades, light reflectors, waste baskets and the like. In fact it may be advantageously applied to one or more projecting edge portions for reinforcing them, irrespective of where they might be located on the article.

Although I have shown the leading end only of the strip as being serrated, it is to be understood that if desired one or both side edges of the strip may be serrated throughout their length, without departing from the spirit of the invention. When the strip is relieved or serrated throughout its length, the inner of the telescoped ends of the rim will, due to the relieved portions, have discontinuous penetrating engagement with the article, thereby avoiding any shearing action, in much the same manner as the illustrated embodiments.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. An article formed of relatively soft material and having a marginal portion, a metal rim fitting around said marginal portion for reinforcing said article, said rim being generally C-shaped in transverse section and having its side edges disposed in biting engagement with said marginal portion, the ends of said rim being telescoped in tight engagement with each other and fitting around said marginal portion, and the innermost telescoped portion of said rim having a plurality of teeth firmly embedded in said marginal portion.

2. An article formed of relatively soft material and having a marginal portion of comparatively thin section, a strip of metal extending around said article and being transversely curved into generally C-shape, with its side edges disposed in firmly gripping engagement with the opposite sides of said marginal portion, and with its ends overlapped, said strip having a multiplicity of notches along one side edge thereof, whereby continuity of engagement thereof with said marginal portion is interrupted at certain places in its length.

3. A receptacle member formed of relatively soft material and having an opening, a closure member fitting over said opening, a uniting band of metal fitting around said members for holding said closure tightly on said receptacle, said band being transversely curved into generally C-shape, with its side edges disposed in firmly gripping engagement with the opposite sides of said members, and with its ends overlapped, said band having a plurality of notches along one side thereof, whereby continuity of engagement thereof with said members is interrupted at certain places in its length and shearing of said members is avoided.

4. In an article of manufacture, an article formed of relatively soft material and having a marginal portion, and a reinforcing band of hard material fitted over said portion, said band being so applied as to cause its side edges to bite into gripping engagement with said marginal portion and having its ends telescoped in tightly interlocked engagement, said band being relieved at intervals to provide teeth along both side edges thereof, said teeth being embedded in both sides of the marginal portion of said article, whereby the innermost end of said band may be partially embedded in said edge, and yet shearing of any appreciable length of the latter is avoided.

ALLEN B. WILSON.